June 5, 1962  F. W. BROOKS  3,037,487
BRAKE BOOSTER VALVE MEANS
Filed Nov. 28, 1960  2 Sheets-Sheet 1

INVENTOR.
Frank W. Brooks
BY
HIS ATTORNEY

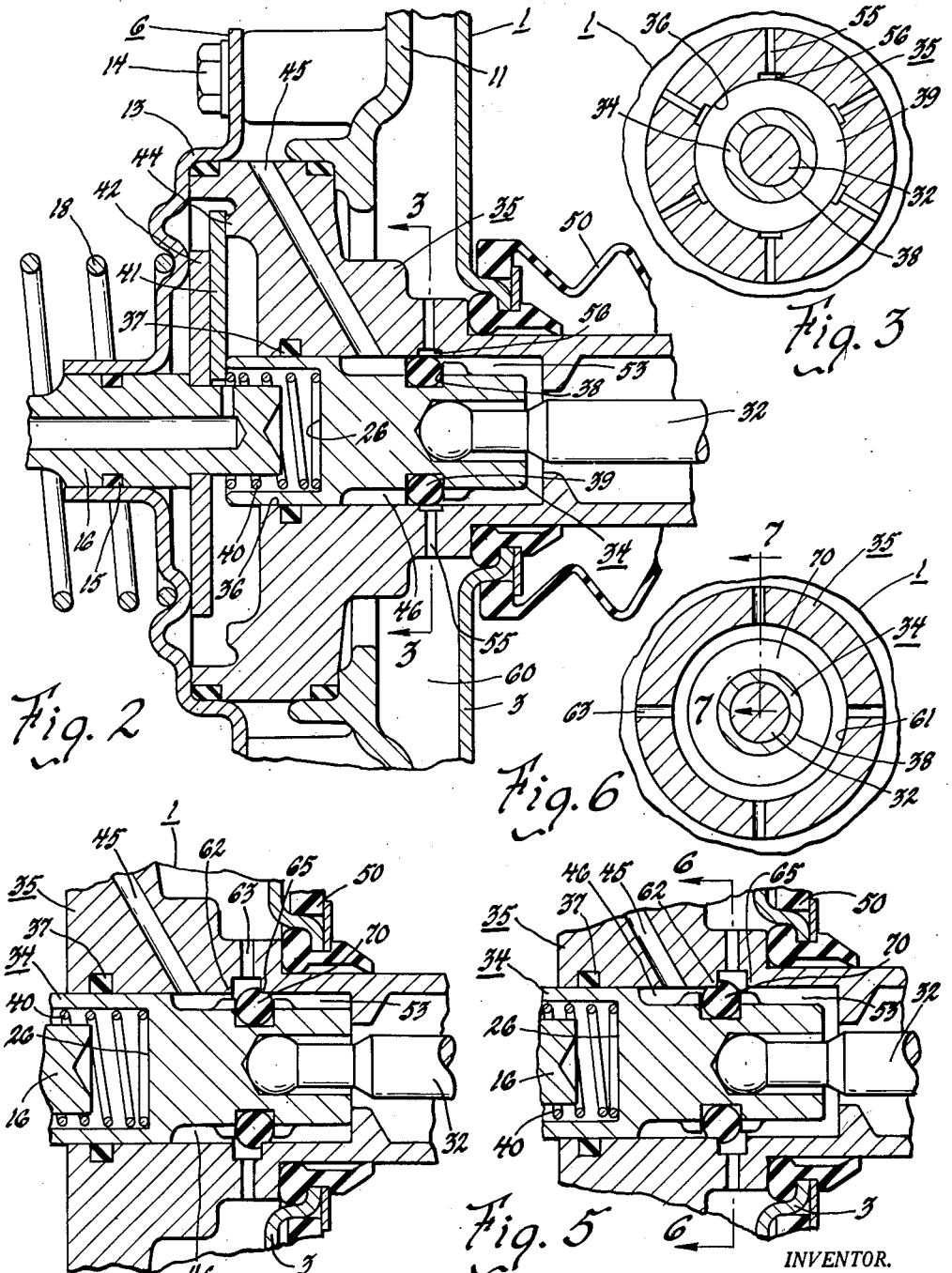

UNITED STATES PATENT OFFICE 3,037,487
Patented June 5, 1962

3,037,487
BRAKE BOOSTER VALVE MEANS
Frank W. Brooks, Dayton, Ohio, assignor to General Motors Corporation, Detroit, Mich., a corporation of Delaware
Filed Nov. 28, 1960, Ser. No. 72,219
13 Claims. (Cl. 121—41)

This invention relates to a brake booster unit and more particularly to a valve mechanism operating in combination with the booster unit.

It is an object of this invention to provide a valve means for a booster unit having cylindrical valve seats on a stationary member and a valve element moving relative to the valve seats to control the flow of the low and high pressure fluid in response to manual operation.

It is another object of this invention to provide radial passages for the modulated air and axial passages for the low and high pressure air which are controlled for selective communication by axial movement in response to manual means.

It is a further object of this invention to provide an annular recess in a manually controlled member for receiving a valve element to move axially relative to an annular groove forming the valve seats for controlling the flow of low and high pressure fluid for operation of the booster unit.

It is a further object of this invention to provide a brake booster unit including a sleeve member receiving a slidable carriage retaining a sealing means to operate as a valve mechanism in response to relative movement of said carriage relative to said sleeve thereby controlling the flow of high and low pressure fluid for operation of the brake booster unit.

The objects of this invention are accomplished by employing a diaphragm booster unit whereby the outer periphery of the power wall is sealed by a rolling diaphragm. The central portion of the power wall receives a valve mechanism including a slidable carriage concentrically mounted within the valve housing. The slidable carriage supports a circular ring which operates as the valve means in combination with the carriage and the valve housing. The ring is moved axially in response to manual control which selectively opens and closes high and low pressure fluid passages to the modulated air passage for controlling the movement of the power wall. The three elements including the valve housing, the valve carriage and the valve element provide a valve means and operate by axial movement of the carriage.

Further objects and advantages of the present invention will be apparent from the following description, reference being had to the accompanying drawings wherein preferred embodiments of the present invention are clearly shown.

In the drawings:

FIGURE 2 is an enlarged cross-section view of the valve structure in position for operating the booster unit.

FIGURE 3 is a cross-section view taken on line 3—3 of FIGURE 2.

FIGURE 4 is a modified version of the valve structure in the closed position.

FIGURE 5 is an enlarged cross-section view similar to FIGURE 4 but the valve structure is in the open position for operating the booster unit.

FIGURE 6 is a cross-section view taken from line 6—6 of FIGURE 5.

Figures 1, 7:
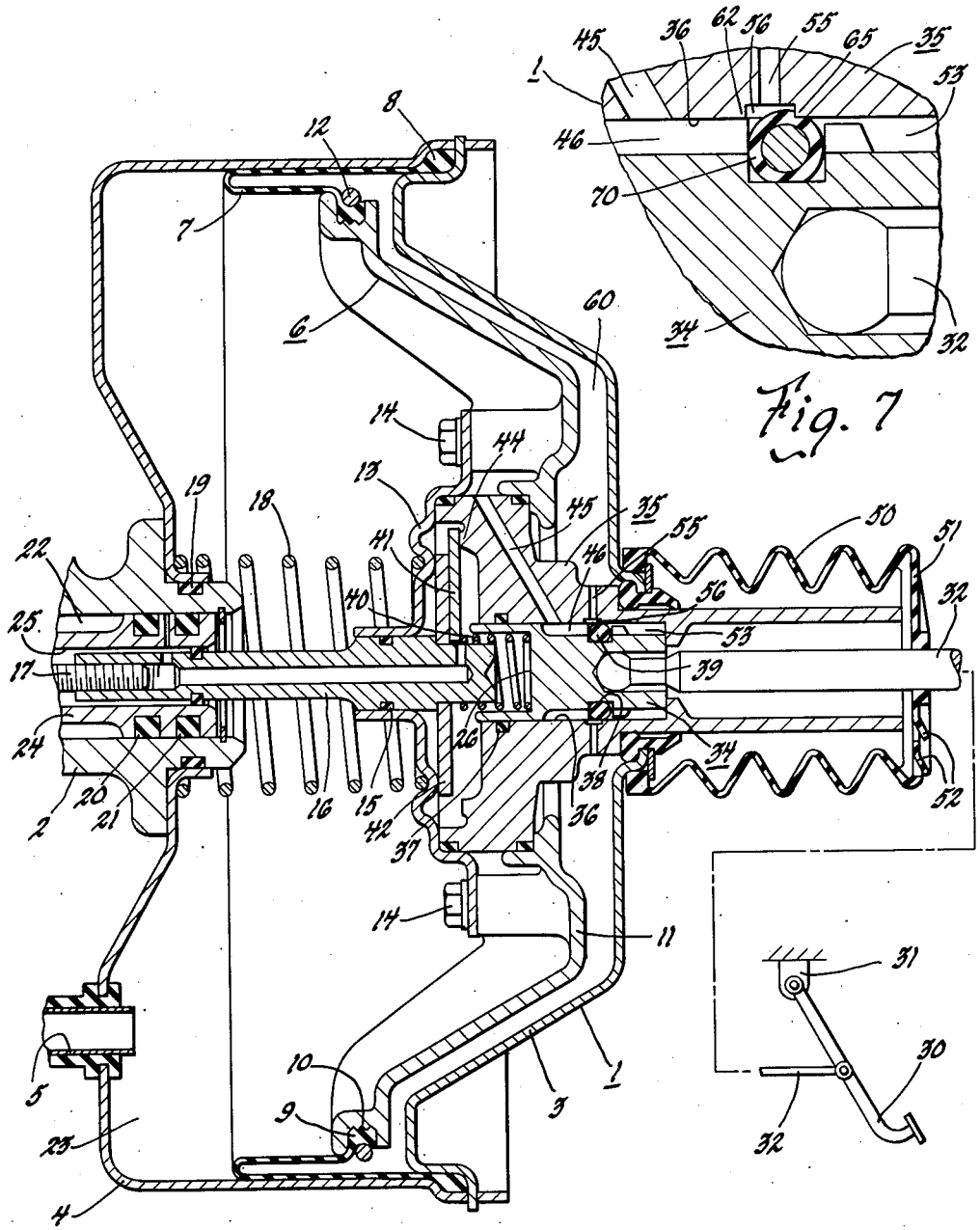
FIGURE 1 is a cross-section view of the booster unit disclosing the valve structure.
FIGURE 7 is a cross-section view showing a modification of the annular ring operating as a valve element.

Referring to FIGURE 1, the booster unit 1 is connected to a master cylinder 2. The booster unit 1 is formed with a valve housing including a rear casing section 3, a forward casing section 4. A vacuum inlet passage 5 is connected to the forward casing section 4.

The interior portion of the booster unit includes a power wall 6. The power wall operates with the diaphragm 7 which has a peripheral bead 8 which is sealed by the forward casing section 4 and a rearward casing section 3 as the two sections are locked in an assembled position.

The inner periphery of the diaphragm 7 forms a bead 9 which is received within an annular recess 10 on the outer periphery of the diaphragm support 11. The inner peripheral bead 9 is retained within this position by the ring 12.

The diaphragm support 11 is fastened to the spring seat 13 by means of a plurality of bolts 14. The spring seat 13 is sealed on its inner periphery by a seal 15 on the force transmitting member 16. The force transmitting member 16 extends axially forward and is provided with a threaded portion for receiving a bolt 17. The retraction spring 18 is compressibly positioned between the forward casing section 4 and the spring seat 13 to bias the power wall 6 to its rearward retracted position.

The inner periphery of the forward casing section 4 is sealed between the outer portion of the master cylinder by the seal 19. The inner periphery of the master cylinder receives the secondary seals 20 and 21 to seal hydraulic fluid in the follow-up chamber 22 and the master cylinder from the constant pressure chamber 23 in the booster unit 1.

The master piston 24 extends forwardly within a master cylinder 2. The master piston 24 has a central opening 25 extending forwardly from the rearward end of the master piston 24. The forward end of the central opening 25 has a radial wall not shown which engages the head of the bolt 17 to provide a means for adjusting the position of the force transmitting members 16 relative to a master piston 24. This position is preadjusted to provide the proper valve actuation in the booster unit.

The booster unit 1 is operated by a manual operating means including a brake pedal 30 pivotally mounted on a chassis 31 and pivotally connected to a push rod 32. The push rod 32 extends into the booster unit 1 and engages a central opening of the valve carriage 34. The valve housing 35 forms a sleeve with a central opening 36. The valve carriage 34 is received within the central opening 36 of the valve housing 35. A seal 37 is received within the annular recess in the forward end of the valve housing to form a seal between the valve carriage 34 and the valve housing 35. An annular recess 38 is formed on the outer periphery of the valve carriage 34. The annular recess 38 receives the valve element 39. The valve element 39 forms a seal between the valve carriage and the valve housing. The axial movement of the valve carriage 34 is controlled by the push rod 32 in response to manual operation. The valve carriage 34 is biased to a rearwardly retracted position by the spring 40 when the brakes are retracted. The valve carriage spring 40 is compressibly mounted between the plurality of fingers 41 and the radial wall 26 on the forward end of the valve carriage 34.

A reaction means is provided within the forward end of the valve housing. The force transmitting member 16 receives a reaction plate 42 on its outer periphery. The reaction plate 42 creates a rearward thrust against the plurality of fingers 41 which are pivotally mounted with a fulcrum point on the ridge 44 and the valve housing 35. The radial inner portion of the plurality of fingers 41 engages the forward end of the valve carriage 34. In this manner, the reaction force transmitted by the force transmitting member 16 is distributed between the valve housing 35 and the valve carriage 34 in proportion to the leverage of the plurality of fingers upon engagement with the reaction plate and the valve carriage 34.

The vacuum conduit 5 leads into the constant pressure chamber 23 of the booster unit 1. The constant pressure chamber 23 is in communication with the valve means through the passage 45. The passage 45 is in communication with the plurality of axial passages 46 formed on the outer periphery of the valve carriage 34 which are in communication with the annular groove 38 on the outer periphery of the valve carriage 34.

The boot 50 is received on a disk 51 on the outer periphery of a push rod 32. The disk 51 has louvers to permit the entrance of air on the rearward end of the boot 50. The air passing through the levers 52 moves axially forward to the axial passages 53 formed on the outer periphery of the valve carriage 34. The passages 53 are in communication with the annular groove 38 formed on the outer periphery of the valve carriage 34. In this manner, the valve element 39 forms a seal between the passages 46 and 53.

A plurality of radial passages 55 are formed within the valve housing 35. The radial passages 55 are counterbored on their inner periphery to form a larger opening 56 which is in communication with the central opening 36 in the valve housing 35. The valve carriage 34 is biased through a rearward position placing communication between the radial passages 55 and the axial passages 46 to provide equal pressure in the variable pressure chamber 60 and the constant pressure chamber 23 when the booster unit is in its retracted position.

FIGURES 1, 2 and 3 disclose the original disclosure of the valve means. FIGURES 4, 5, 6 and 7 disclose a modified version of the booster unit. The disclosure in FIGURE 7, however, is an added modification of a valve element disclosed in FIGURES 5 and 6.

Referring to FIGURE 4, the valve structure is basically the same; however, the O ring 70 has a larger cross section. The O ring is received within the recess on the outer periphery of the valve carriage 34. The O ring 70 extends into an annular groove 61 formed in the valve housing 35. In this manner, the O ring 70 is received within both the annular recess 38 and the recess 61. The O ring 70 seats on the edge 62 of the recess 61 in the operating position to place communication between the passage 63 and 53. In the rearward position for the valve carriage 34 the O ring engages the edge 65 of the recess 61. This position places the radial passage 63 in communication with the axial passage 46 on the carriage 34. The operation of this modification is basically the same in its carriage travel except that the seal is formed by the engagement of the O ring with the edge of the recess 61 instead of sliding beyond the radial passages in the valve housing.

The O ring as illustrated in FIGURES 4 and 5 is constructed of a resilient material such as rubber. The modification illustrated in FIGURE 7, however, provides a metal ring which is coated with a rubber to provide a more firm contact of the valve seats with the O ring. The O ring constructed in this manner is less deformable than the solid rubber O ring.

The operation of the device will be described in the following paragraphs.

As a booster unit is in its retracted position, a spring 18 biases the power wall 6 to its rearwardly retracting position. The valve carriage spring 40 biases the valve carriage 34 to its retracted position. In this position, the constant pressure compartment 23 is in communication with the variable pressure compartment 60 through the valve means. Accordingly, the vacuum in the constant pressure compartment 23 is also present in the variable pressure compartment 60.

As the brake pedal 30 is depressed, the push rod 32 moves forwardly within the booster unit shifting the valve carriage 34 forwardly relative to the valve housing 35. The forward movement of the valve carriage 34 carries the valve element 39. As the valve element 39 moves beyond the radial passages 55, communication between the constant pressure compartment 23 and the variable pressure compartment 60 is closed. The continued forward movement of the valve carriage 34 and the valve element 39 places communication between the variable pressure compartment 60 and the air passages 53. The air is permitted to flow through the louvers 52 within the inner periphery of the rearward sleeve portion of the valve housing 35. The air passes through the axial passages 53 by the valve element 39 into the radial passages 55 pressurizing the variable pressure compartment 60 in the booster unit. With the increase in pressure in the variable pressure compartment 60, the power wall moves forwardly creating a pressurization within the master cylinder 2. As long as the brake pedal is depressed, the push rod 32 continues forward maintaining communication between the variable pressure compartment 60 and the source of air pressure.

Upon release of the brake pedal 30, the air valve carriage spring 40 biases the carriage 34 rearwardly. The retraction spring 18 within the booster unit 1 biases the power wall 6 rearwardly. The power wall, however, remains in this position until the pressure in the variable pressure compartments 60 is substantially reduced to permit the rearward movement of the power wall. The reduction of pressure is accomplished by retracting the valve carriage 34 and the valve element 39 until communication is present between the constant pressure compartment 23 and the variable pressure compartment 60. In this position, the air in the variable pressure compartment 60 is evacuated and the spring 18 moves the power wall rearwardly. The spring 40 maintains the valve carriage 34 in its retracted position maintaining communication between the variable pressure compartments 60 and the constant pressure compartment 23. Upon equalization of the pressure within the two compartments 60 and 23, the power wall is biased rearwardly by the spring 18. The power wall is again in its normally retracted position.

Referring to the modification illustrated in FIGURES 3, 4, 5 and 6, the movement of the valve carriage 34 is in the same manner as previously described. The O ring 70 also moves in unison with the valve carriage 34. The O ring, however, does not slide within the inner periphery of the sleeve beyond the recess in the housing. The O ring engages the air valve seat 65 in its rearwardly retracted position. As the air valve carriage 34 moves forwardly, the O ring is unseated from the air valve seat 65. With the forward movement of the valve carriage 34, the O ring then contacts the vacuum valve seat 62. With the contact of the vacuum valve seat 62, communication is placed between the ambient air pressure and the variable pressure compartment 60. In this position, the power wall moves forwardly under the influence of pressurized fluid in the variable pressure compartment 60.

The booster unit is retracted by permitting the unseating of the O ring from the vacuum valve element 62. The O ring 70 moves rearwardly with the carriage 34 unseating the O ring from the vacuum valve seat 62 and seating upon the air valve seat 65. In this position, equalization of pressure is again restored within the variable pressure compartment 60 and the constant pressure compartment 23. The power wall is then biased to its rearwardly retracted position by the spring 18.

It can be seen from the illustration and the description that applicant's invention provides a means for controlling the vacuum and air for operation of the booster unit. The valve mechanism is a relative simple device in comparison to some valve means employed in a booster unit of this type. The valve mechanism employs the fundamental parts of a carriage and a valve element to move in response to the movement of the manual means. This in turn controls the flow of pressurized air or vacuum to the variable pressure compartment in the booster unit to provide operation and pressurization of fluid for actuation of the vehicle brakes.

While the embodiments of the present invention as herein disclosed constitute preferred forms, it is to be understood that other forms might be adopted.

What is claimed is as follows:

1. A brake booster unit comprising in combination, a booster unit housing, a pressure responsive member forming a variable pressure compartment and a constant pressure compartment, a force transmitting member connected to said pressure responsive member, a source of vacuum in communication with said constant pressure compartment, valve means in said pressure responsive member including, a valve housing, a cylindrical opening formed concentric with said valve housing, a valve carriage slidably mounted in said central opening of said valve housing, an annular recess formed on the outer periphery of said valve carriage, a plurality of longitudinal passages angularly spaced about the outer periphery of said valve carriage, passage means from said constant pressure compartment in said pressure responsive member in communication with said plurality of angularly spaced axial passages in said valve carriage, an annular member positioned in said annular recess in said valve carriage, manual means for slidably positioning said valve carriage for selectively controlling communication from said variable pressure compartment to said source of vacuum and a source of air in response to manual movement of said valve carriage when said booster unit is actuated.

2. A brake booster unit comprising in combination, a booster unit housing, a pressure responsive member forming a variable pressure compartment and a constant pressure compartment in said housing, a force transmitting member connected to said pressure responsive member, valve means in said pressure responsive member, a source of low pressurized fluid in communication with said valve means, said valve means including a housing mounted in said pressure responsive member, a central opening longitudinally through said housing in said pressure responsive member, a valve carriage received within said central opening of said housing, a plurality of axial extending passages angularly spaced about the outer periphery of said valve carriage, an annular recess on the outer periphery of said valve carriage, a valve element received within said annular recess engaging the inner periphery of said central opening of said valve housing, substantially radial passages communicating with the inner periphery of said central opening in said valve housing, and said variable pressure compartment, manual means for moving said valve carriage axially for selectively controlling the flow of fluid from said variable pressure compartment to said constant pressure compartment, and from said variable pressure compartment to the atmosphere to provide operation of said booster unit.

3. A brake booster unit comprising in combination, a booster unit housing, a pressure responsive member forming a variable pressure compartment and a constant pressure compartment in said booster unit housing, a force transmitting member connected to said pressure responsive member, a valve means in said pressure responsive member, a source of low pressure fluid in communication with said valve means, said valve means including, a valve housing, a plurality of radial passage angularly spaced about said valve housing, a longitudinal opening extending through said valve housing in said communication with said radial passages, a valve carriage slidably mounted within said central opening in said valve housing, a plurality of longitudinal passages angularly spaced about the outer periphery of said valve carriage, an annular recess formed about the outer periphery of said valve carriage, an annular valve element received within said annular recess forming a seal between the forward and rearward portion of said longitudinal passages in said valve carriage, said valve element effecting communication between said variable pressure compartment and said constant pressure compartment when said booster unit is in its retracted position, said valve element effecting communication between atmospheric air pressure and said variable pressure compartment in said booster unit to provide power operation of said pressure responsive member when said booster unit is operated.

4. A brake booster unit comprising in combination, a booster unit housing, a pressure responsive member forming a variable pressure compartment and a constant pressure compartment in said booster unit housing, a force transmitting member connected to said pressure responsive member, a valve means in said pressure responsive member, a source of low pressure fluid in communication with said valve means, said valve means including, a valve housing, a central opening extending through the central portion of said valve housing, a plurality of radial passages having center lines on a plane normal to the axial center of said central opening, a valve or carriage slidably mounted within said central opening in said valve housing, a plurality of axial passages angularly about the outer periphery of said valve carriage, an annular recess formed about the outer periphery of said valve carriage, the forward portions of said axial passages on said valve carriage in communication with said constant pressure compartment, said radial passages in said valve housing in communication with said variable pressure compartment, the rearward portion of said axial passages formed on said valve carriage in communication with ambient air pressure about said booster unit, an O ring valve element received within said annular recess about the outer periphery of said valve carriage, said O ring forming a seal between said rearward portions of said passages in said valve carriage and the radial passages in said valve housing when said booster unit is in its retracted position, said O ring closing communication between the forward portion of said axial passages on said valve carriage with the radial passages in said valve housing to permit pressurization in said variable pressure compartment to provide operation of said booster unit when said manual means move said carriage forwardly for operation of said booster unit.

5. A brake booster unit comprising in combination, a booster unit housing, a pressure responsive member forming a variable pressure compartment and a constant pressure compartment said booster unit, a force transmitting member connected to said pressure responsive member, a valve means mounted in said pressure responsive member, a source of low pressure pressurized fluid in communication with said valve means, said valve means including, a valve housing mounted concentrically within said pressure responsive member, a central opening extending concentrically through said valve housing, a plurality of radial passages angularly spaced in a plane normal to the axis of said central opening in said valve housing and angularly spaced to connect said variable pressure compartment with said central opening in said valve housing, a valve carriage received within said central opening of said valve housing, an annular recess formed in the outer periphery and intermediate portion of said valve carriage, a plurality of passages angularly spaced about the outer periphery of said valve carriage in communication with said angular recess and said constant pressure compartment, a plurality of axial passages on said valve carriage in communication with said angular recess and atmospheric air pressure about said booster unit, an O ring positioned in said annular recess, manual means for moving said valve carriage axially to selectively communicate said variable pressure compartment with said constant pressure compartment and said atmospheric air pressure to provide operation of said booster unit.

6. A brake booster unit comprising in combination, a brake booster housing, a pressure responsive member forming a variable pressure compartment and a constant pressure compartment in said booster unit housing, a force transmitting member connected to said pressure responsive member, a valve means in said pressure responsive member, a source of low pressurized fluid in communication with said valve means, said valve means including, a valve housing, a longitudinal passage extending concentrically through said valve housing, a plurality of radial extending passages in communication with said variable pressure compartment and said central opening in said valve housing, a valve carriage centrally mounted within said central opening of said valve housing, an annular recess communicating with said plurality of radial passages in said valve housing, an annular groove formed in the outer periphery of said valve carriage, a plurality of axial passages formed on said valve carriage in communication with said annular groove, a rubber O ring positioned in said annular groove on the outer periphery of said valve carriage to selectively control communication of said variable pressure compartment with said constant pressure compartment and an air pressure to provide operation of said booster unit in response to manual control of said manual means.

7. A brake booster unit comprising in combination, a booster unit housing, a pressure responsive member forming a variable pressure compartment and a constant pressure compartment in said booster unit housing, a force transmitting member connected to said pressure responsive member, a valve means in said pressure responsive member, a source of pressurized air in communication with said valve means, said valve means including a valve housing in said pressure responsive member, a longitudinal passage extending through the central portion of said valve housing, a plurality of radial passages having center lines on a common plane normal to the axis of said central opening of said valve housing, a valve carriage slidably mounted in said central opening of said valve housing, an annular groove formed about the outer periphery of said valve carriage, an annular recess formed on the inner periphery of said valve housing and said central opening communicating with said plurality of radial passages, an annular ring received within said annular groove of said valve carriage and said annular recess in said valve housing, said annular ring formed of a metal portion coated with a resilient material, a plurality of axially extending passages in communication with said annular groove and said constant pressure compartment, a plurality of axially extending grooves in the outer periphery of said valve carriage in communication with said annular groove and atmospheric air pressure of said booster unit, manual means for slidably moving said valve carriage and said valve element to selectively control communication between said variable pressure compartment and said constant pressure compartment and said variable pressure compartment and the atmospheric air pressure to provide operation of said booster unit in response to control of said manual means.

8. A brake booster unit comprising in combination a booster unit housing, a pressure responsive member dividing said housing into a variable pressure chamber and a constant pressure chamber, a force transmitting member connected with said pressure responsive member, passage means for connecting a source of low pressure fluid and a source of high pressure fluid with said variable pressure chamber through valve means, valve means in said pressure responsive member including a valve housing having an annular groove connected by passage means with said variable pressure chamber and adapted for connection with said first mentioned passage means, a valve carriage concentrically located within said valve housing including an annular valve element engageable with said valve housing selectively at opposite sides of said groove to control thereby connection of the said groove with the said first mentioned passage means, and valve operating means for moving the same to selectively connect said annular groove with said first mentioned passage means.

9. A brake booster unit comprising in combination, a booster unit housing having a pressure differential responsive member forming with said housing a variable pressure chamber and a constant pressure chamber, valve means controlling fluid flow relative to said chambers including a valve housing having an annular groove connected by passage means with the variable pressure chamber and in connection with other passage means conducting actuating fluid, and a resilient annular valve member movable in said valve housing axially relative to said annular groove and engaging the housing at opposite sides of the groove selectively to control thereby fluid flow to and from the groove and thereby to and from said variable pressure chamber, and means for moving said valve member selectively relative to opposite sides of said groove to control fluid flow to and from said groove thereby.

10. A brake booster unit comprising in combination, a booster unit housing having a pressure differential responsive member forming with said housing a variable pressure chamber and a constant pressure chamber, valve means controlling fluid flow relative to said chambers including a valve housing having an annular groove connected by passage means with the variable pressure chamber and in connection with other passage means conducting actuating fluid, a single resilient annular valve member in said valve housing movable in engaging relationship between opposite sides of the groove axially thereof selectively to control thereby fluid flow to and from the groove and thereby to and from said variable pressure chamber, and means for moving said valve member selectively between opposite sides of said groove.

11. A brake booster unit comprising the structure set forth in claim 10 wherein the said annular valve member comprises an O ring.

12. A brake booster unit comprising in combination, a booster unit housing having a pressure differential responsive member forming with said housing a variable pressure chamber and a constant pressure chamber, valve means controlling fluid flow relative to said chambers including a valve housing having an annular groove connected by passage means with the variable pressure chamber, second passage means at one side of said groove for conducting a first fluid pressure, third passage means at the opposite side of said groove for conducting a second fluid pressure, a single resilient annular valve member in said housing movable axially relative to said groove and engaging the housing at opposite sides of the groove selectively to control thereby fluid flow to and from said groove with respect to said second and third passages, and means for moving said valve member selectively relative to opposite sides of said groove for said selection of fluid flow control to and from said groove.

13. A brake booster unit comprising the combination set forth in claim 12 wherein said resilient annular valve member is positioned partially within said groove and engages opposite edges of the groove formed at the juncture between the wall of the housing and the walls of opposite sides of the groove.

References Cited in the file of this patent

UNITED STATES PATENTS

| | | |
|---|---|---|
| 2,743,707 | Kellersman | May 1, 1956 |
| 2,826,042 | Rike et al. | Mar. 11, 1958 |
| 2,828,719 | Ayers | Apr. 1, 1958 |
| 2,861,427 | Whitten | Nov. 25, 1958 |
| 2,867,193 | Ayers | Jan. 6, 1959 |
| 2,914,035 | Banker | Nov. 24, 1959 |